May 29, 1945.　　　　L. F. NORRIS　　　　2,377,261
MILK DISPENSER
Filed March 25, 1944　　　　2 Sheets-Sheet 1
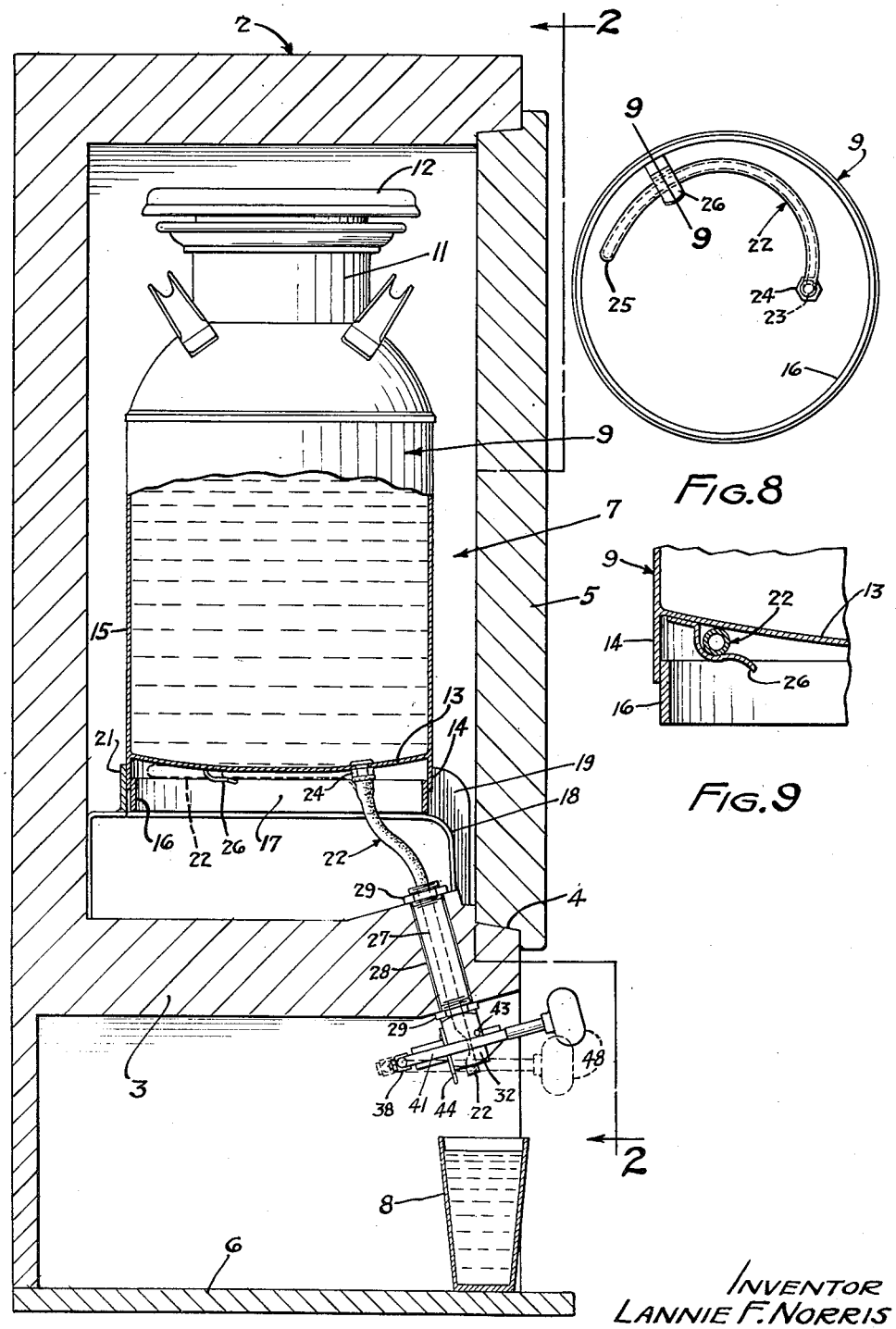
INVENTOR
LANNIE F. NORRIS
By Paul, Paul & Moore
ATTORNEYS May 29, 1945. L. F. NORRIS 2,377,261
MILK DISPENSER
Filed March 25, 1944 2 Sheets-Sheet 2
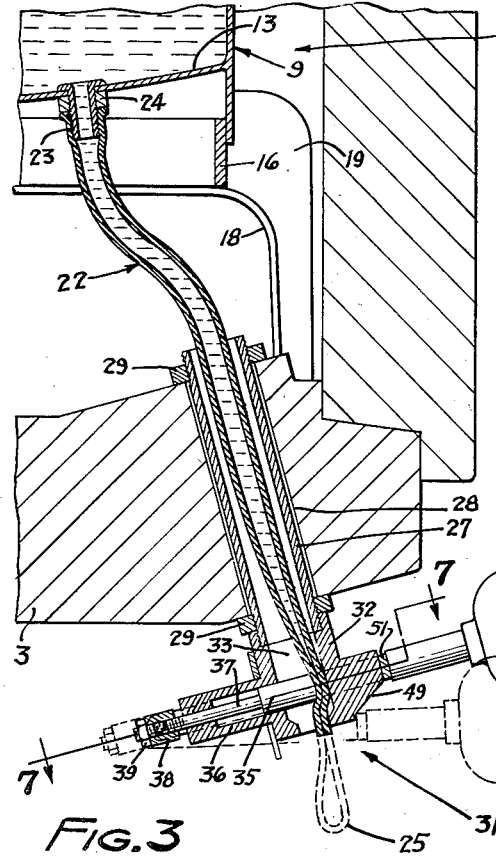
FIG.3
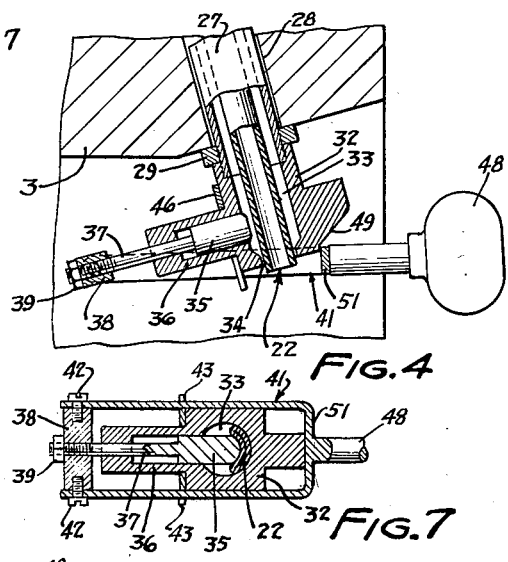
FIG.4
FIG.7
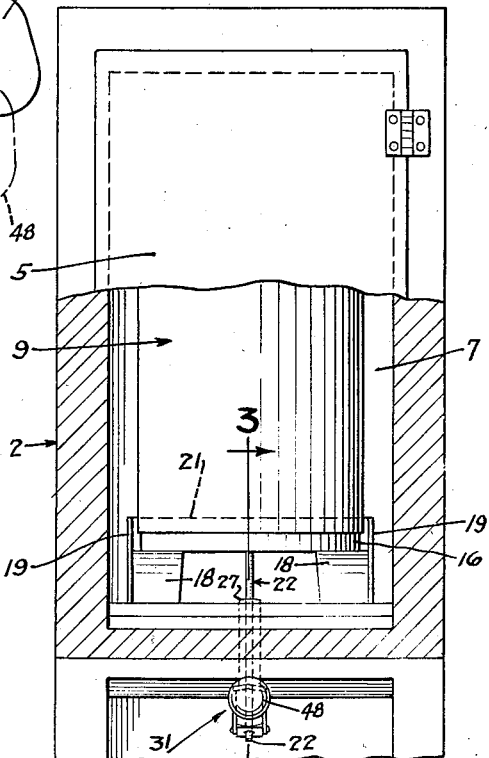
FIG.2
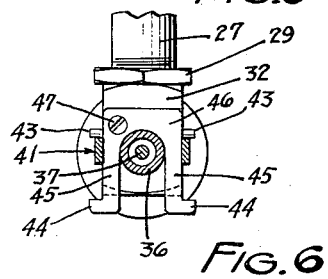
FIG.5
FIG.6
INVENTOR
LANNIE F. NORRIS
BY Paul, Paul & Moore
ATTORNEYS Patented May 29, 1945

2,377,261

UNITED STATES PATENT OFFICE 2,377,261

MILK DISPENSER

Lannie F. Norris, Minneapolis, Minn.

Application March 25, 1944, Serial No. 528,052

3 Claims. (Cl. 222—184)

This invention relates to new and useful improvements in apparatus for dispensing milk in small quantities, and more particularly to an apparatus of the general character disclosed in my pending application, Serial Number 442,605, filed May 12, 1942.

It is now common practice in restaurants and other places where large quantities of milk are served to the public in small quantities, to purchase the milk from creameries or milk distributors in small bottles or containers, each containing one serving. To serve milk from such small bottles or containers requires considerable labor and a large storage space is necessary. When the milk is received from the creamery or milk distributor it is usually cool or chilled, and must be kept in such a state until served to retain its palatability and to prevent spoilage. Such small milk bottles or containers must be transported from the creamery or distributor to the dispenser in suitable crates which are bulky and require considerable storage space in transit and therefore limits the size of the pay load or quantity of milk which may be transported in a single load.

Before the bottled milk is served to a customer it is usually necessary, for sanitary reasons, to thoroughly cleanse or wash the bottles or containers in which the milk is received from the creamery before the bottles are opened to permit the discharge of their contents into glasses. This requires added labor and, in addition, when the bottles have been emptied of their contents some creameries usually require the retailer to rinse the bottles before they are returned to the creamery.

It will thus be seen that to handle milk for the trade in small bottles as above stated, entails considerable labor and also a relatively large storage space in a suitable cooler or refrigerator as the milk must be kept cool until served. In other words, when a delivery of milk is received from the creamery the milk bottles may be removed from the crates and placed in a refrigerator or cooling chamber, from whence bottles are periodically removed and placed on a service counter to render them more convenient for the attendant to serve the milk to customers, particularly during the rush hours. The attendant usually removes the cap from each bottle served.

It will thus be seen that in accordance with the usual practice now commonly carried out in the sale of milk in restaurants and such places, each bottle of milk must be handled several times from the time it reaches the restaurant until it is returned to the crate for return shipment to the creamery, which may result in frequent breakage of bottles and loss of milk and thus further add to the cost of dispensing the milk.

An important object of the present invention therefore is to provide an improved method of dispensing milk in small servings, which is extremely simple and economical, and which provides the utmost in sanitation.

In accordance with the present invention, the milk is dispensed in small quantities or servings directly from relatively large containers, such as conventional milk cans. The cans are so constructed and arranged that they may be filled at the creamery in the usual manner and their closures sealed to the open tops thereof, in which condition the filled cans are delivered to the restaurants or other places where the milk is to be dispensed, means being embodied in the lower portion or bottom of each can or container whereby the milk may be dispensed therefrom without requiring removal of the closure from the can top, and whereby the contents of the can is at no time exposed to the atmosphere until it is eventually dispensed therefrom into a glass or other receiving means.

A further object of the invention is to provide a dispensing device in the bottom of each container or milk can which is initially permanently sealed at the creamery, whereby when the can is filled and the usual closure is applied to the open top thereof, the milk may be delivered to the dispenser without danger of becoming contaminated as a result of exposure to the atmosphere or other foreign matter, the means provided at the bottom of the can being so constructed that the milk may be dispensed directly from the can into a glass or container without passing through a control valve such as disclosed in my pending application heretofore mentioned.

Another important object of the invention is to provide means on each can by which one end of a flexible tube may be readily attached to the can before the can is filled, in a manner to establish communication between the tube and the interior of the of the can, the opposite free end of said tube being initially permanently sealed and folded into position against the bottom of the can, whereby the can may be transported from the creamery to the restaurant in the usual manner, after which the sealed end of the tube may be severed from the tube whereby the milk may readily be dispensed directly from the can through said tube into a glass, the flow of milk through the tube being controlled entirely by pinching together the walls of the tube.

A further object is to provide a can or container having means at its bottom for detachably receiving one end of a flexible dispensing tube whose opposite free end is initially permanently sealed to prevent liquid flow through the tube when the can or container is in transit, said tube requiring that its sealed end be severed therefrom when milk or other liquid is to be dispensed from the can, and said tube being discarded when the can has been emptied of its contents, whereby a new sterilized sealed tube must be attached to the can each time the empty can is returned to the creamery for filling.

A further object is to provide an apparatus for dispensing milk in small servings directly from a relatively large container or can, comprising a cooling chamber having means therein for supporting a can with its bottom spaced from the bottom wall of the cooling chamber, and an enlarged bore being provided in the bottom wall of the cooling chamber adapted to receive one end portion of a flexible tube whose opposite end is attached to a wall of the can whereby the tube is in communication with the interior of the can, and means being provided at the lower end of said enlarged bore for pinching together the walls of the tube to control fluid flow therethrough, after the free end portion of the tube has been inserted through said enlarged bore and the sealed end thereof has been severed from the tube.

Another important object of the invention is to provide means on each can by which one end of a flexible tube may be readily attached to the can prior to each filling of the can and in a manner to establish communication between the tube and the interior of the can, the opposite free end of said tube being initially permanently sealed and folded into position against the bottom of the can, whereby the can may be transported from the creamery to the restaurant in the usual manner, after which the sealed end of the tube is severed from the tube to permit the milk or contents of the can to be readily dispensed directly from the can through said tube into a glass or other container, the flow of milk or other liquid through the tube being controlled entirely by pinching together the walls of the tube.

A further object is to provide a can or container having means at its bottom for detachably receiving one end of a flexible dispensing tube whose opposite free end is initially permanently sealed to prevent liquid flow through the tube, when the can or container is in transit, said tube requiring that its sealed end be severed therefrom before the milk or other liquid in the can may be dispensed therefrom, and said tube being discarded when the can has been emptied of its contents, whereby a new sterilized sealed tube must be attached to the can each time the empty can is returned to the creamery for filling.

A further object is to provide an apparatus for dispensing milk in small servings directly from a relatively large container or can, comprising a cooling chamber having means for supporting a can with its bottom spaced from the bottom wall of the cooling chamber, and an enlarged bore being provided in the bottom wall of the cooling chamber adapted to receive the free sealed end portion of a flexible dispensing tube whose opposite end is attached to a wall of the can whereby the tube is in communication with the interior of the can, and means being provided at the lower end of said enlarged bore for pinching together the walls of the tube to control fluid flow therethrough, after the sealed end of the tube has been broken or completely severed from the tube.

A further object of the invention is to provide a simple, inexpensive apparatus for quickly and conveniently dispensing various non-settling liquids such as homogenized milk, drinking water, fruit flavored beverages, and other food drinks, whereby such liquids may be expeditiously dispensed in small servings in a highly sanitary and efficient manner; and said apparatus also lending itself for use in dispensing various non-edible liquids as, for example, lubricating oils, whereby such oils may be sold to the motoring public or consumer in bulk form directly from relatively large sealed containers or drums, thereby making it possible to completely eliminate the usual expensive operation of putting such lubricating oils up in small sealed containers, usually one quart bottles or cans, for distribution to the public. The novel dispensing method herein disclosed will thus assure the motorist or consumer that the particular oil which he may be purchasing will be thoroughly clean and free from foreign matter, which is highly essential in the maintenance of high speed motors to obtain maximum wear of the operating parts thereof.

Other objects of the invention reside in the provision of means on the bottom wall of the can or container for detachably attatching one end of a flexible tube to the can whereby the tube is in communication with the interior of the can, the opposite end of the tube being initially permanently sealed to prevent fluid flow through the tube when the can is transported from the creamery or place of filling to the restaurant or dispenser; in the means provided for retaining the tube within the confines of the bottom flange of the can whereby the tube will not interfere with the transportation or handling of the can in the usual manner, and whereby the tube will be protected at all times against damage as a result of rough handling of the can; in the provision of a tubular member in the bottom wall of the cooling chamber for receiving the free end of the flexible tube, the bore of said tubular member being relatively larger than the outside diameter of the tube whereby cool air from the cooling chamber may circulate around the tube substantially the full length thereof; and in the novel valve means provided at the lower end of said tubular member for pinching together or contracting the walls of the tube to control milk flow through the tube, after the initially sealed tip of the tube has been severed therefrom.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view of my improved apparatus showing a can mounted within the cooling chamber with the dispensing tube conditioned for dispensing;

Figure 2 is a sectional view substantially on the line 2—2 of Figure 1;

Figure 3 is an enlarged detail sectional view on the line 3—3 of Figure 2 showing the "valve"

provided for controlling fluid flow through the flexible tube, the valve being shown in closed position.

Figure 4 is a view similar to Figure 3 on a smaller scale showing the valve in open position;

Figure 5 is a bottom view of the control valve;

Figure 6 is a detail sectional view on the line 6—6 of Figure 5;

Figure 7 is a detail sectional view on the line 7—7 of Figure 3;

Figure 8 is a bottom view of a milk can showing the position of the sealed tube when the can is in transit; and Figure 9 is a detail sectional view on the line 9—9 of Figure 8, showing the clip for supporting the free end of the tube.

The novel milk dispensing apparatus herein disclosed is shown comprising a suitable refrigerating cabinet, generally designated by the numeral 2, having a bottom wall 3 and a front opening 4 normally closed by a suitable door 5. A suitable table top 6 is shown provided below the bottom wall 3 of the cooling or refrigerating chamber 7 adapted to support a glass 8 or other receptacle in which the milk is to be dispensed from a can 9 supported within the cooling chamber 7.

As shown in Figure 1, the can or container 9 may be a conventional milk can having the usual neck 11 provided with a filler opening adapted to be closed and sealed by a suitable closure 12. The bottom wall 13 of the can is surrounded by the usual annular flange 14 which may be a continuation of the cylindrical side wall 15 of the can, as clearly illustrated in the drawings. In Figures 1 and 3 the can is shown provided with an auxiliary bottom flange 16 which is suitably secured in fixed relation to the bottom flange 14 of the can by suitable means, not specifically shown in the drawings.

The provision of the auxiliary flange 16 is well known in the art. The downwardly extended bottom flange 14—16 of the can protects the bottom wall 13 from contacting obstructions and makes it possible to stack the cans one upon another as is well known. In addition, it provides a space 17 beneath the can bottom which lends itself for use in connection with my invention, as will subsequently be described.

In Figures 1, 2 and 3 it will be noted the can is supported in spaced relation from all of the walls of the cooling chamber 7, thereby to provide for adequate air circulation therearound. Suitable means, not shown, is provided for cooling the air within the refrigerating chamber.

To support the can in spaced relation to the bottom wall 3, a pair of spaced rails 18 are provided in the lower portion of the chamber 7 which have upstanding side flanges 19 to guide the can as the latter is pushed rearwardly into the cooling chamber, as will be understood by reference to Figures 1 and 2. A transverse stop flange 21 is preferably provided adjacent the rear ends of the rails 18 to limit the rearward movement of the can into the cooling chamber.

One of the important features of the present invention resides in the means provided for dispensing milk directly from the can 9 into the glass 8 without removing the closure 12 from the can top, once the can has been filled with milk and its closure sealed.

To thus dispense milk from the can, one end of a flexible tube 22 is attached to the bottom wall 13 of the can by such means as a nipple 23, which is shown permanently secured to the bottom wall 13 of the can by such means as a lock nut 24 best shown in Figure 3, although it is to be understood that the nipple may be welded directly to the bottom wall 13, if desired. The opposite or lower end 25 of the tube is initially permanently sealed as shown in Figures 3 and 8, and before the can is to be filled the tube is coiled against the bottom wall of the can as shown in Figure 8 and retained in such position by a suitable clip 26, best shown in Figures 8 and 9. When the tube is thus positioned, it will be retained well above the bottom edge of the can flange 16, as indicated by the dotted lines in Figure 1, whereby it is not likely to become damaged when the can is being transported from one place to another.

Mounted in the bottom wall 3 of the cooling chamber is an enlarged tubular member 27 which, as shown in Figure 3, may be threaded at each end to facilitate demountably supporting it in a suitable aperture 28 provided in the bottom wall 3. Lock nuts 29 are shown received in threaded engagement with the ends of the tubular member 27 for securing it in position, and also whereby the ends of the aperture 28 in which it is mounted are sealed to prevent air leakage around the tubular member 27.

A suitable control valve, generally designated by the numeral 31, is secured to the lower end of the tubular member 27 preferably by being received in threaded engagement with the lower threaded end thereof as clearly illustrated in Figures 3 and 4. The valve 31 comprises a body 32 having a chamber 33 therein communicating with the lower end of the tubular member 27. The chamber 33 terminates at its lower end in a reduced opening 34 of such size as to readily receive the lower end portion of the flexible dispensing tube 22, as shown in Figures 3 and 4.

A plunger 35 is mounted in a guide 36 which may be integrally formed with the valve body 32. The plunger 35 has a stem 37 projecting from the end of the guide 36 and a suitable cross head 38 is shown secured to the projecting end portion of the stem 37 by such means as a nut 39. The cross head 38 may also be received in threaded engagement with the end of the stem 37 as shown in Figures 3, 4 and 5, to securely attach it thereto.

A yoke 41 has its spaced legs pivotally connected to the ends of the cross head 38 by suitable pivot pins 42 and is mounted for pivotal movement thereon between suitable limit stops 43 and 44. The upper limit stops 43 may be in the form of pins secured in the valve body 32, and the lower stops 44 are shown provided in the spaced legs 45 of a U-shaped piece 46 which is shown straddling the guide 36 and is secured to the valve body 32 by a suitable screw 47, received in threaded engagement with the valve body, as will be understood.

The yoke 41 has an operating handle 48 secured thereto whereby the yoke may readily be swung up or down between the full and dotted line positions shown in Figure 3, thereby to longitudinally translate the plunger 35 in the guide 36.

To impart longitudinal or axial movement to the plunger 35 when the handle 48 is oscillated, a cam surface 49 is provided on the valve body 32 adapted to be engaged by the cross bar 51 of the yoke 41, when the handle is swung up or down as indicated by the full and dotted line positions shown in Figure 3.

In the operation of this novel dispensing apparatus, particularly when used for dispensing milk, the can 9 which may be of conventional construction as hereinbefore stated, is filled at the creamery in the usual manner and the cover applied thereto and sealed. Before milk is introduced into the can, however, a fresh piece of sterilized flexible tubing 22 has one end attached to the nipple 23, as shown in Figure 3, and the sealed free end portion of the tubing is then folded against the bottom wall of the can and into engagement with the clip 26, as shown in Figure 8. The can may then be transported from the creamery to the dispenser in the usual manner as will readily be understood, because the tube 22 will be protected from damage by the bottom flange 16 of the can, as clearly illustrated by the dotted lines in Figure 1.

When the can is delivered to the dispenser it is placed in the cooling chamber 7 without removing or unsealing its top closure 12. The free sealed end of the flexible tube is then detached from the clip 26 and inserted through the enlarged bore provided in the tubular member 27 with its lower end extending downwardly through the opening 34 provided at the bottom of the valve body 32, as illustrated in Figure 3. When the tube is initially inserted through the tubular member 27 and the chamber 33 in the valve body 32, the operating handle 48 of the valve is in open position, as shown in Figure 4.

After the tube has been inserted through the tubular member 27 and through the chamber 33 in the valve body 32, the valve handle 48 is swung upwardly to the full line position shown in Figure 3, whereupon the plunger 35 will advance and pinch together the walls of the flexible tube as shown, thereby to completely close the tube to fluid flow therethrough. The lower end or tip portion 25 of the tube may then be cut off as, shown in Figures 3 and 4, after which the contents of the can may readily be dispensed directly from the sealed can into serving glasses 8 through the dispensing tube 22 by manipulation of the valve handle 48.

By further reference to Figure 3, it will be noted that the plunger 35 is located in close proximity to the valve body whereby when the sealed end of the tube is cut off as shown in Figure 3, and the plunger is in tube closing position the entire end of the tube will be flattened as shown, whereby no milk is retained in the end of the tube below the plunger, and there is little danger of the interior of the end of the tube becoming contaminated from foreign matter because of being exposed.

By thus dispensing the milk from the can it will be noted that at no time does the milk come in contact with the walls of the valve chamber 33 nor with any other exposed metal parts after it leaves the can. The enlarged air circulating space provided around the tube permits free circulation of cool air around the tube substantially the full length thereof, whereby the milk contained within the tube between servings will be maintained at substantially the same temperature as that within the can in the cooling chamber.

When the can has been emptied of its contents the sealed can is removed from the cooling chamber and if desired the free end of the tube may again be folded against the bottom of the can into engagement with the clip 26, as shown in Figure 8, in which condition the empty can may be returned to the creamery for refilling.

When the empty can is returned to the creamery the used flexible dispensing tube 22 is removed from the can and discarded, and the can is then thoroughly cleansed and sterilized in the usual manner. After the can has gone through the usual sterilizing process, a fresh piece of sterilized tubing is attached to the nipple 23 as hereinbefore stated, and the free sealed end of the tube folded into engagement with the clip 26, after which the can may again be filled with a fresh supply of milk and its open top sealed in the usual manner. Replacing the used piece of tubing with a fresh sealed piece of tubing each time the can has been emptied is of utmost importance in that it is then impossible to contaminate the milk contained in the sealed can, once the can has been filled and suitably sealed.

By utilizing a milk dispensing apparatus such as herein disclosed, the milk cannot become contaminated by unsanitary valves, which is possible when the milk is dispensed by means of valves which directly contact the milk and which require periodic and frequent cleansing and sterilizing to assure the consumers that they are receiving milk which adequately meets the requirements of sanitation of the pure food and health authorities.

The apparatus is extremely simple and inexpensive and does not require expensive alterations to the conventional form of milk can to adapt such cans for use in connection with this dispensing apparatus.

While I have herein described the invention as used principally for the dispensing of milk, it is to be understood that it may be utilized for various other liquids, such as drinking water, fruit flavored beverages, non-settling liquids and oil. By dispensing liquids from an apparatus such as herein disclosed the consumer or purchaser is assured of the quality of the material which he is purchasing as the container or can is sealed at the place of filling, and such seal is not broken until the can or container is delivered to the retailer or restaurant, after which only the lower sealed tip 25 of the tube 22 is cut off to permit dispensing of the liquid from the container. The filler cap or closure 12 of the can is not removed nor is its seal broken until the can has been emptied of its contents and is returned for refilling. The apparatus has been found particularly useful and economic for dispensing homogenized milk and, other non-setting liquids which will retain their normal consistency without agitation.

The novel dispensing apparatus herein disclosed, in addition to having proven very practical and efficient as a quick and convenient means for dispensing small servings of homogenized milk in restaurants and similar places, also readily lends itself for use in Army camps for dispensing milk in small servings to large numbers of individuals. The milk as hereinbefore stated, is dispensed directly from the cans in which it is shipped from the creamery or distributor, and such cans may be of any convenient size suitable for the purpose. By its use the usual objection hereinbefore prevalent in dispensing large quantities of milk is small containers such as bottles, has been completely eliminated, and in addition to greatly facilitating the transportation and serving of the milk, the usual labor heretofore necessary to handle large numbers of small bottles has been eliminated and the usual space hereinbefore found necessary to provide storage for the full and empty milk crates has been made available for other purposes.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. The combination with a milk can comprising a base flange and a bottom wall spaced upwardly from the lower edge of said flange, of a nipple secured to said bottom wall and in communication with the interior of the can, an elongated flexible conduit having one end initially permanently sealed and its opposite open end detachably secured to and in communication with said nipple, and means for retaining the free sealed end portion of the conduit in position adjacent to the bottom wall of the can within the confines of the base flange, thereby to permit normal handling of the can when in transit, said conduit serving as a dispensing tube to dispense milk from the can when the free end thereof is subsequently released from said retaining means and its sealed terminal severed therefrom.

2. The combination with a container comprising a base flange and a bottom wall spaced upwardly from the lower edge of said flange, of means providing an opening in said bottom wall, an elongated flexible conduit having one end initially permanently sealed and its opposite end open, means for detachably connecting the open end of the conduit to the opening-forming means in the bottom wall of the container whereby the conduit is in communication with the interior of the container, and means for retaining the free sealed end portion of the conduit in position adjacent to the bottom wall of the container within the confines of the base flange, thereby to permit normal handling of the container when in transit, said conduit serving as a dispensing tube for the container when the free end of the conduit is released from said retaining means and its sealed terminal is severed therefrom.

3. The combination with a container comprising a base flange and a bottom wall spaced upwardly from the lower edge of said flange, of an elongated flexible dispensing tube having one end initially permanently sealed and its opposite end open, means for detachably securing the open end of the tube to the bottom wall of the container and whereby the tube is in communication with the interior of the can, means for releasably retaining the free sealed end portion of the tube in position adjacent to the bottom wall of the container and within the confines of said flange, said conduit serving as a dispensing tube for dispensing liquid from the container when the tube is released from said retaining means and its sealed terminal severed therefrom, the severing of the sealed end from the tube requiring that a fresh sealed tube be attached to the container each time it is refilled.

LANNIE F. NORRIS.